United States Patent
Viitanen

(10) Patent No.: US 8,319,490 B2
(45) Date of Patent: Nov. 27, 2012

(54) METHOD IN CONNECTION WITH FREQUENCY CONVERTER

(75) Inventor: Tero Viitanen, Vantaa (FI)

(73) Assignee: ABB Oy, Helsinki (FI)

( * ) Notice: Subject to any disclaimer, the term of this patent is extended or adjusted under 35 U.S.C. 154(b) by 101 days.

(21) Appl. No.: 11/862,536

(22) Filed: Sep. 27, 2007

(65) Prior Publication Data

US 2008/0079417 A1 Apr. 3, 2008

(30) Foreign Application Priority Data

Sep. 29, 2006 (EP) .................................. 06121487

(51) Int. Cl.
*G01R 23/12* (2006.01)
(52) U.S. Cl. .................................. 324/76.53; 324/76.77
(58) Field of Classification Search ................. 324/76.53
See application file for complete search history.

(56) References Cited

U.S. PATENT DOCUMENTS

| | | | | |
|---|---|---|---|---|
| 3,165,671 | A * | 1/1965 | Martin Mintz et al. | 361/63 |
| 3,699,441 | A * | 10/1972 | Linders | 324/86 |
| 4,641,090 | A * | 2/1987 | Danby | 324/107 |
| 4,670,696 | A * | 6/1987 | Byrne et al. | 318/701 |
| 5,309,346 | A * | 5/1994 | Gyugyi | 363/54 |
| 6,242,708 | B1 * | 6/2001 | Marchand et al. | 218/153 |
| 6,396,225 | B1 | 5/2002 | Wakui et al. | |
| 6,914,794 | B2 * | 7/2005 | Watanabe et al. | 363/132 |
| 2001/0019249 | A1 | 9/2001 | Kato et al. | |
| 2003/0173972 | A1 | 9/2003 | Boscolo et al. | |
| 2005/0047045 | A1 * | 3/2005 | Puskar et al. | 361/115 |
| 2006/0256587 | A1 * | 11/2006 | Asplund et al. | 363/37 |

FOREIGN PATENT DOCUMENTS

WO WO 94/03965 A1 2/1994

OTHER PUBLICATIONS

Basic, Zhu, and Boardman, "Transient performance study of a brushless doubly fed twin stator induction generatior", IEEE Trans. on Energy Conversion, V. 18, N. 3, 2003, p. 400-408.*
European Search Report dated Mar. 15, 2007.
European Office Action dated Mar. 26, 2007.

* cited by examiner

*Primary Examiner* — Thomas Valone
(74) *Attorney, Agent, or Firm* — Buchanan Ingersoll & Rooney PC

(57) ABSTRACT

A method of determining a rotational state of a three-phase alternating voltage supply which is connected to a converter and rotating in an uncontrolled manner, wherein the converter is connected to an intermediate voltage circuit and comprises phase-specific upper and lower controllable switches, which are connected in series between the intermediate voltage circuit, free-wheeling diodes connected in parallel with each of the controllable switches, and resistive circuits connected in parallel with the lower controllable switches. The method comprises the steps of selecting a voltage limit, comparing the voltages of the alternating voltage supply in the resistive circuits with the voltage limit, determining a first time instant when any of the voltages of the resistive circuits crosses the voltage limit, determining a second time instant when any of the voltages of the resistive circuits subsequently crosses the voltage limit, determining the phase sequence of the converter output phases from the phases that crossed the voltage limit at the first and second time instants, determining the frequency of the alternating voltage source from the determined time instants, the method being applicable when the voltage of the intermediate circuit is equal to or higher than the voltage of the alternating voltage source.

22 Claims, 7 Drawing Sheets

METHOD IN CONNECTION WITH FREQUENCY CONVERTER

TECHNICAL FIELD

The present disclosure relates to a method for determining properties of an alternating voltage source, and particularly to a method with which a converter can be synchronized with an alternating voltage source.

BACKGROUND INFORMATION

When a permanent magnet synchronous machine, either a generator or a motor, is rotating, a stator voltage that is proportional to the angular speed and machine parameters is being induced. Similar induced voltage is present also in the stator of a rotating induction machine if the rotor flux has non-zero value. A typical situation where the machine is rotating without control is, for example, a motor drive that drives a load that has a large moment of inertia. When the supplying network fails and the frequency converter or inverter is not able to control the load, the motor begins to act as a generator rotated by the load. To be able to control the load again when the supply is back up, the rotational speed and orientation of the rotor and the initial stator voltage have to be estimated. Other situations can also occur in which the rotor is rotating without control.

FIG. 1 shows a simplified equivalent circuit of an inverter and rotating motor. R1, R2, R3, L1, L2, L3 and Emot1, Emot2, Emot3 represent phase resistances, phase inductances and induced phase voltages of the motor, respectively.

In the example of FIG. 1 the motor is fed with a conventional inverter bridge which consists of active gate commutated semiconductor switches S11, S21, S31 in the upper branch and S12, S22, S32 in the lower branch, and parallel diodes D11, D21, D31 in the upper branch and D21, D22, D32 in the lower branch. Motor currents are measured with phase-specific current measurement elements AM1, AM2, AM3 in connection with the inverter unit. The current of the third phase can also be calculated from only two current measurements since the sum of all phase currents in a three-wire three-phase system is zero, so that only two current measurement elements are needed. The state information of the switches, which is used for example to determine the switching time delays and possible malfunctions of the switches, is measured using high ohmic measurement resistor circuit R11, R12; R21, R22; R31, R32 in parallel with each of the semiconductor switching components in the lower branch. These resistor circuits in the example of FIG. 1 comprise two resistors in series and produce thus resistive voltage division of the voltage over the lower branch switches. It is clear, however, that resistive voltage division may comprise different number of resistors depending on the need.

When the active states of the inverter switches are changed with some modulation scheme, the phase outputs of the inverter are connected to either high intermediate voltage potential Udc+ or to low intermediate voltage potential Udc−. The voltages over the impedances of the energized motor cause currents which may have very high values. In order to keep the currents and the torque produced by the machine with in a tolerable range with respect to the machine in question, the voltage produced by the inverter must have both a suitable magnitude and a direction (phase angle) with respect to the rotating induced voltage generated by the rotating machine. For the above reason the control systems of the inverter must be synchronized with its rotating three-phase load.

In a situation where the frequency converter is taken into use, the intermediate voltage circuit is without any charge thus the DC-voltage is zero. The capacitor of the DC-link has to be charged before any control operations can be carried out. Charging of the DC-link can be carried out for example by using the supply voltage connected to the DC-link via a charging resistor which limits the charging current from the supply. After the DC-link capacitor is charged to the normal operation value, the mains side converter has to be synchronized to the alternating voltage of the supply. This means that the properties, including frequency and phase sequence, of the alternating voltage have to be determined.

FIG. 2 shows a simplified equivalent circuit of a mains side converter 1 and alternating supply voltage 2 with phases U1, U2 and U3. In FIG. 1 the mains side converter consists of active gate commutated semiconductor switches S11, S21, S31 in the upper branch and S12, S22, S32 in the lower branch, and parallel diodes D11, D21, D31 in the upper branch and D21, D22, D32 in the lower branch. The state information of the semiconductor switches, which is used for example to determine the switching time delays and possible malfunctions of the switches, is measured using high ohmic measurement resistor circuit R11, R12; R21, R22; R31, R32 in parallel with each of the semiconductor switching components in the lower branch. These resistor circuits in FIG. 2 comprise two resistors in series and produce thus resistive voltage division of the voltage over the lower branch switches. It is clear, however, that resistive voltage division may comprise different number of resistors depending on the need. Further, in FIG. 2, a filter 3 is placed between the mains voltage and the converter.

When the active states of the converter switches are changed with some modulation scheme, the phase inputs of the converter are connected to either high intermediate voltage potential Udc+ or to low intermediate voltage potential Udc− through the controllable switches. The differing voltages between the supply and intermediate circuit can cause currents that may have very high values. In order to keep the currents in a tolerable range, the control system of the converter must be synchronized with its alternating three-phase supply voltage.

Stable and smooth machine/load control requires thus the inverter control system to be synchronized with the initially rotating motor and the mains side converter control system to be synchronized with the alternating mains voltage. Synchronization is typically implemented with some sort of inverter and converter test voltage pulses applied to the stator of the machine and to the mains side of the converter, the current responses of which are measured and from this, the alternating voltages at the motor side and at the mains side are approximated. International publication WO 94/03965 discloses one such method. Alternatively, the control system can start modulation immediately and control the current to zero, which leads to the fact that the inverter voltage is identical in magnitude and angle to the alternating voltage.

Both of the above methods require switching of the active switches and also accurate and synchronized current measurements from the alternating supply voltage. Furthermore, the application of the first output voltage can lead to high currents if the direction and magnitude of the applied voltage is not chosen correctly.

In some inverters phase currents are not directly measured as in the example of FIG. 1 due to the expenses of the current measurement elements. The current can be measured in normal operation for the purposes of inverter control circuits using only one current measurement from the DC-intermediate circuit using a shunt resistor. FIG. 3 shows one such arrangement where the voltage over shunt resistor $R_{shunt}$ is directly proportional to a current of one inverter output phase when one or two output phases is connected to lower potential Udc− of the intermediate circuit, i.e. when either semiconductor switch or diode of the phase or phases in question are in a conductive state.

The usability of the above current measurement method is limited by the dependence between current information and usable switching states. If, for example, all phase outputs are connected at the same time either to Udc+ or Udc− potential, there is no current through the shunt resistor although current is flowing in the phase conductors of the electrical machine or in the case of mains side converter in the phases of the supply voltage. This limitation due to the current measurement precludes the use of known synchronization methods, where test pulses are applied and the current response is measured.

SUMMARY

An object of the present disclosure is to provide a method so as to overcome the above problems relating to the synchronization of a converter with an alternating voltage source. The converter may be either the mains side converter or the inverter of a frequency converter, whereby the alternating voltage source is a mains voltage or voltage produced by a rotating electrical machine, respectively.

The disclosure is based on the idea that the properties of alternating voltage source can be determined by using resistors already present in the circuitry of an inverter or mains side converter. The determination of the properties is possible when the intermediate voltage of the frequency converter is equal to or higher than the line-to-line voltage produced by the alternating voltage source, i.e. either rotating electrical machine or supply voltage.

An advantage of the method of the disclosure is that it is very simple in structure and it allows for a fast determination of the properties of the alternating voltage source that are needed for full synchronization. The method requires only a minimal amount of additional elements and does not require the input or output phase currents to be measured separately.

BRIEF DESCRIPTION OF THE DRAWINGS

In the following the invention will be described in greater detail by means of exemplary embodiments with reference to the attached drawings, in which.

DETAILED DESCRIPTION

Figure 1:
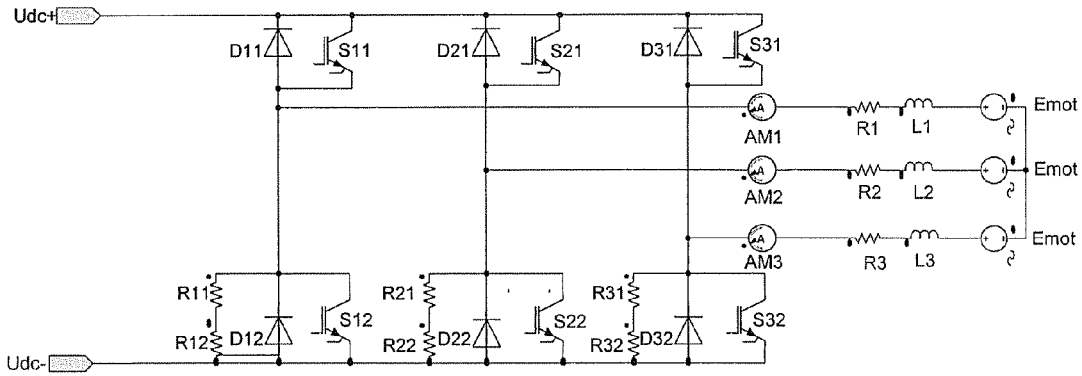
FIG. 1 is a simplified equivalent circuit of an inverter and a rotating electrical machine.
Figure 3:
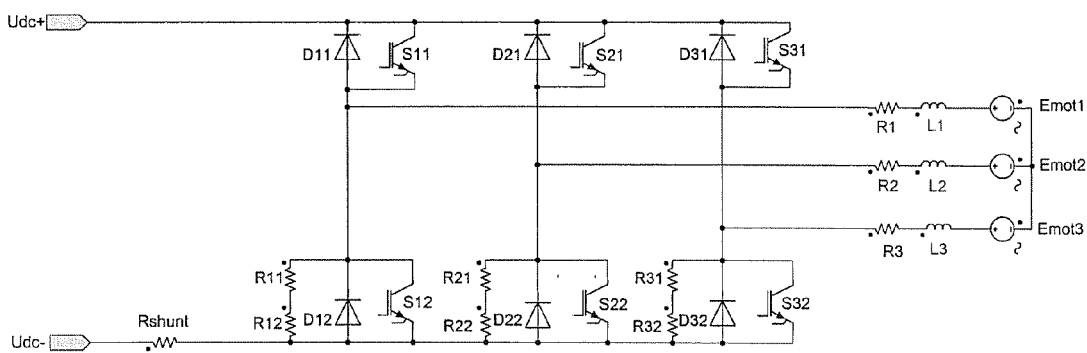
FIG. 3 is another simplified equivalent circuit of an inverter and a rotating electrical machine.

Both FIGS. 1 and 3 show an equivalent circuit of an inverter and a rotating electrical machine connected to the inverter, and the rotating electrical machine is the alternating voltage source to be synchronized with. The inverter is fed from an intermediate voltage circuit providing voltages Udc+ and Udc− to the inverter. The difference between the FIGS. 1 and 3 is the current measurement which in FIG. 1 is carried out by using phase-specific current transducers AM1, AM2, AM3, whereas in FIG. 3 current is measured using a single shunt resistor Rshunt in the lower DC-bus.

Figure 2:
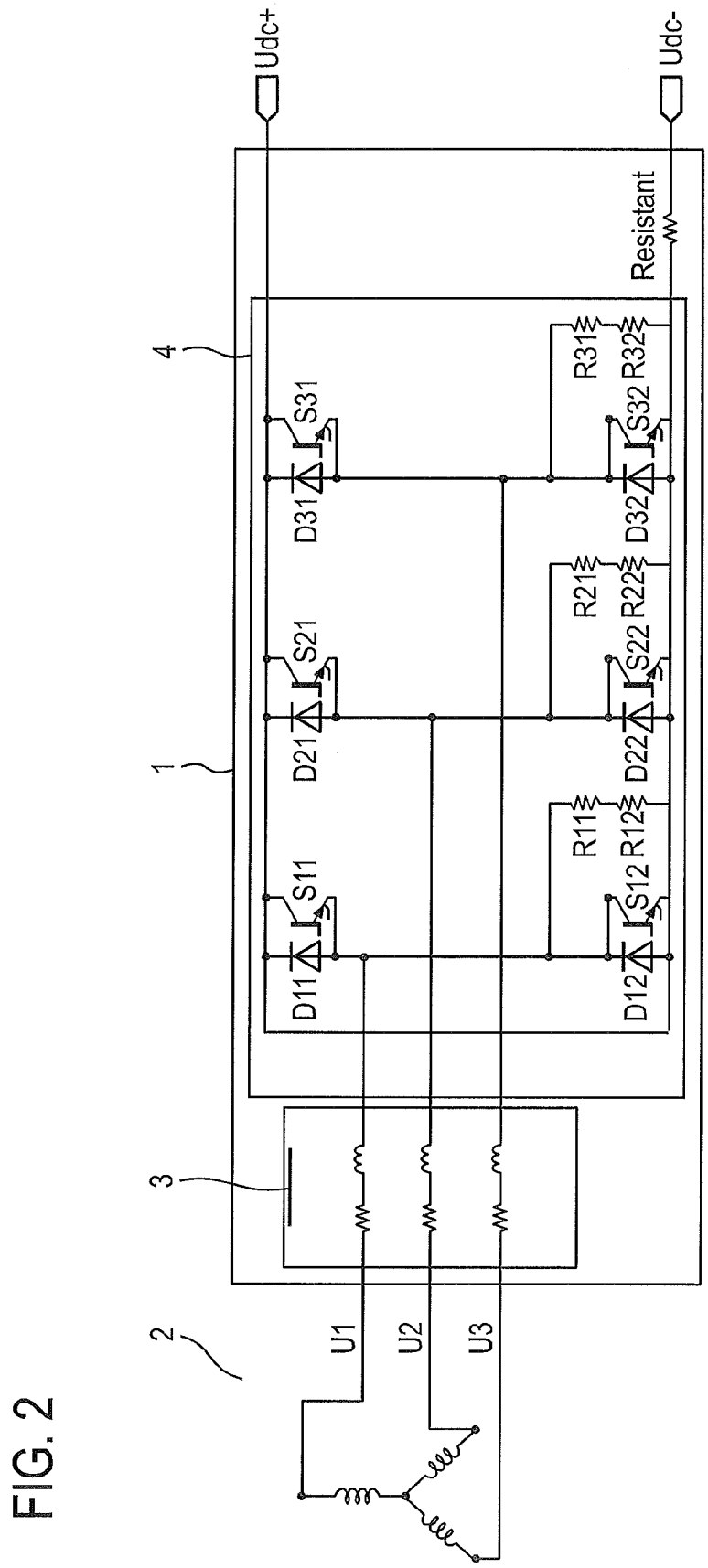
FIG. 2 is a simplified equivalent circuit of a mains side converter and an alternating three-phase supply network.

FIG. 2 shows an equivalent circuit of mains side converter and an alternating three-phase supply voltage connected to the converter. The converter feeds an intermediate voltage circuit providing voltages Udc+ and Udc− to the load, such as an inverter, which is not shown. In FIG. 2 current is measured using a single shunt resistor Rshunt in the lower DC-bus.

The method of the disclosure is described with reference to numerals common to the FIGS. 1, 2 and 3.

The state of the inverter active semiconductor switches is typically measured by using a resistive voltage division measurement across the lower arm IGBTs S12, S22, S32 and free-wheeling diodes D12, D22, D32 as shown in simplified schematic in FIGS. 1, 2 and 3. This state information is used e.g. to approximate the commutation delays. The same voltage measurement configuration can be used also for synchronization purposes according to the present disclosure.

When the motor connected to the inverter output is rotating within its nominal speed range, the induced voltage is smaller than the mains side AC-voltage and thus the DC-link capacitor, i.e. the intermediate voltage, is determined by the maximum mains side line-to-line voltages. This means that the inverter output bridge upper free-wheeling diodes D11, D21, D31 in FIGS. 1 and 3 are in blocking state and there is no current flow in the main circuit due to the induced motor voltage.

Similarly, when a frequency converter is started, the intermediate circuit has to be charged first. The charging can be carried out by placing a charging resistor in series with the capacitor of the intermediate circuit. Three-phase supply voltage then charges the capacitor through the free-wheeling diodes and the resistor. This voltage build-up is shown in FIGS. 4 and 5.

Figure 4:
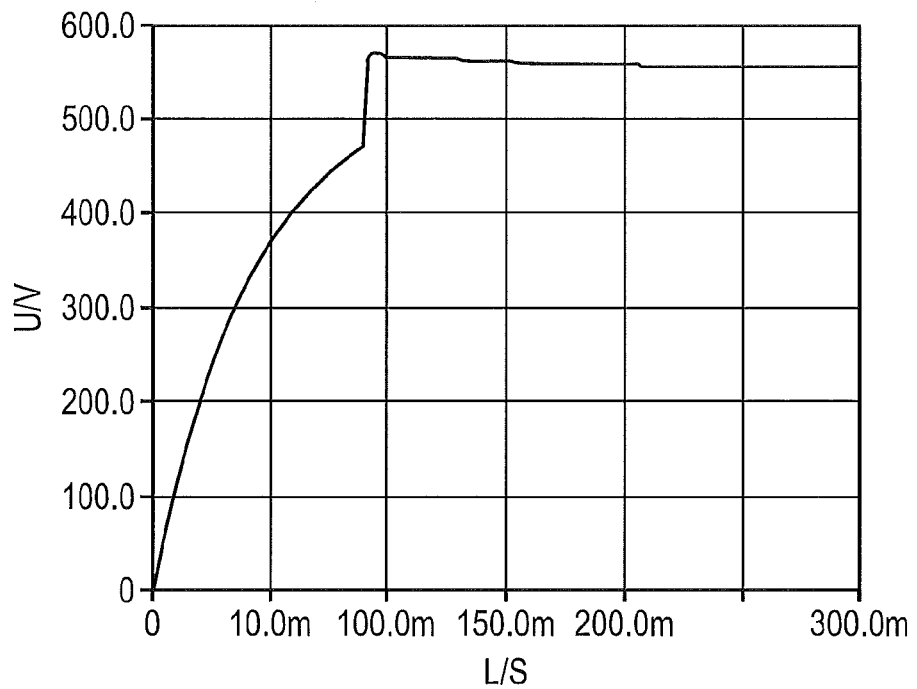
FIGS. 4 and 5 show the voltage of the intermediate circuit during its charging.
Figure 5:
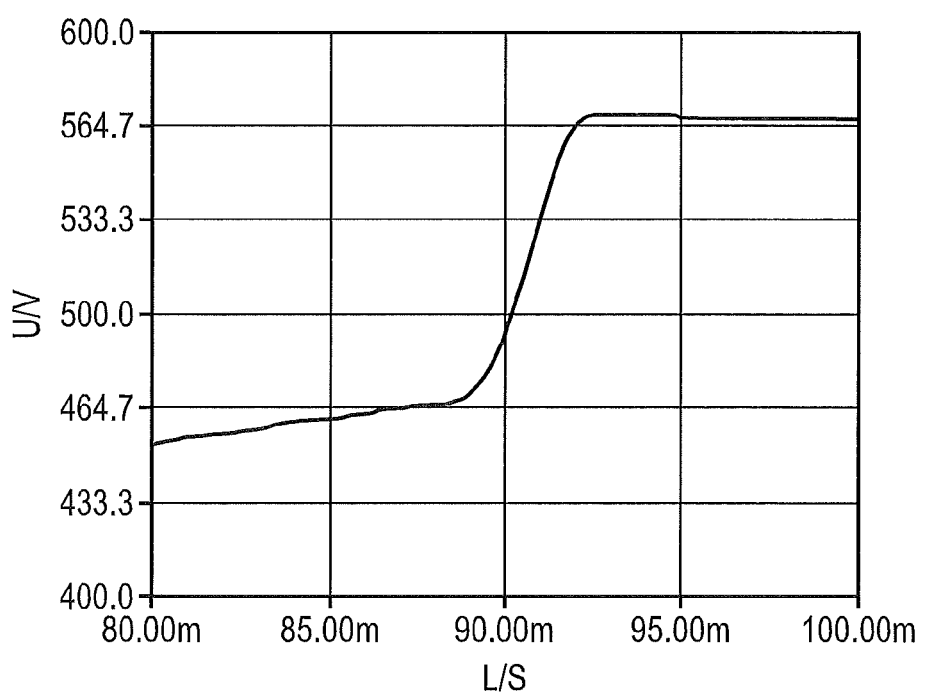

FIG. 4 shows the increasing voltage in a larger scale and FIG. 5 is a partial reproduction of FIG. 4 at the time when the charging resistor is by-passed. In FIGS. 4 and 5 the charging resistor is by-passed approximately at t=89 ms, at which instant the voltage starts to increase more rapidly towards the value of rectified mains voltage.

As can be seen from the FIGS. 4 and 5, the voltage rises a little bit over the value of the rectified mains voltage due to inductances in the current path. This overshoot of voltage further means that the upper free-wheeling diodes D11, D21, D31 of the mains side converter in FIG. 2 are in blocking state and there is no current flow in the main circuit due to the alternating supply voltage.

Figure 6:
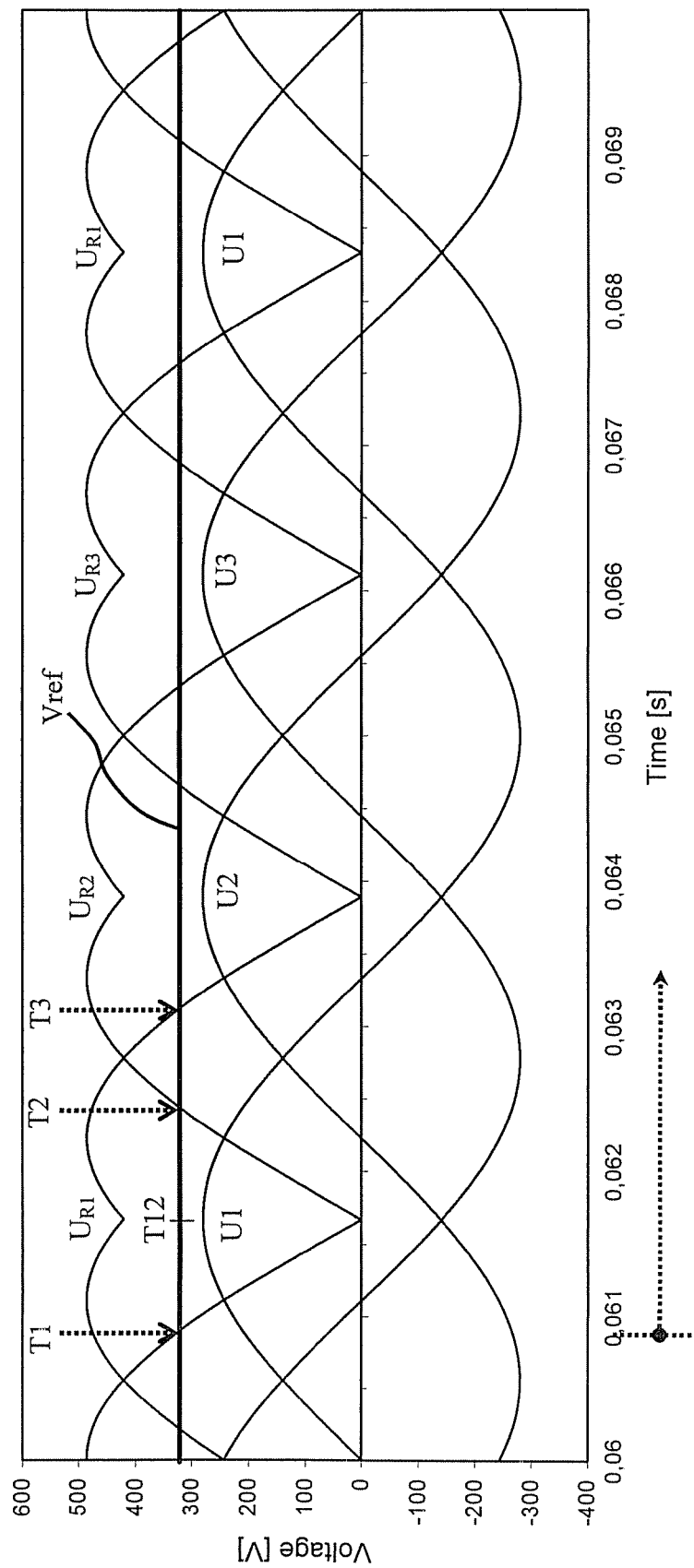
FIGS. 6 and 8 show voltages of an alternating voltage supply and the voltages of the alternating supply in the converter.

However, the alternating supply voltage of FIG. 2 and induced voltage of FIGS. 1 and 3 can be seen across the lower arm resistors as indicated in FIG. 6. Thus FIG. 6 indicates waveforms relating to both FIGS. 1 and 3 (inverter) and FIG. 2 (mains side converter) where the sinusoidal signals represent the phase voltages U1, U2, U3 of the alternating supply voltage (mains side converter) and induced motor phase voltages (inverter) and the other signals the voltages across the resistors $U_{R1}, U_{R2}, U_{R3}$ of corresponding phases respectively. The voltages of the resistors are measured in the potential of the lower DC-bus.

Figure 8:
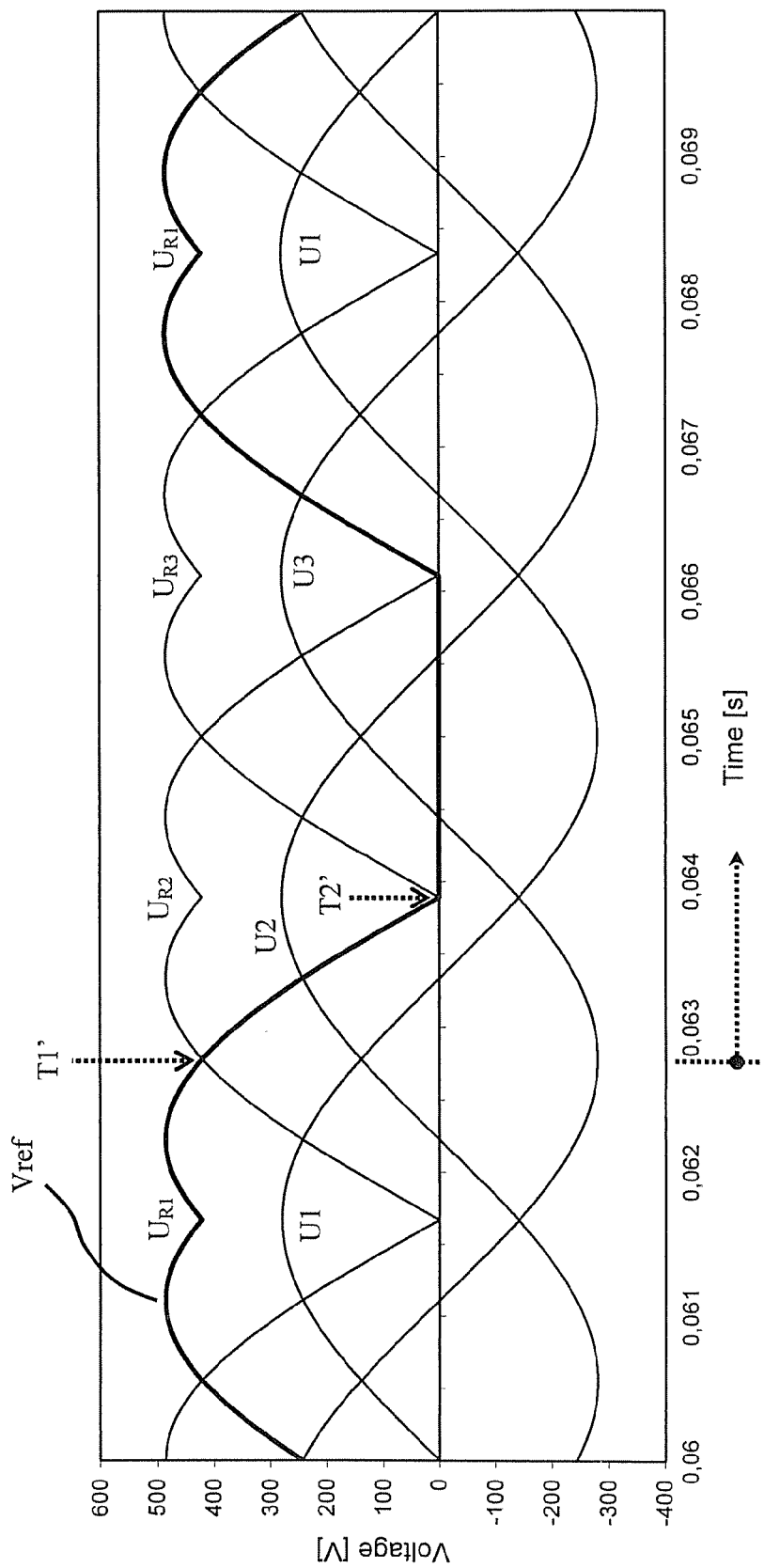
Figure 10:
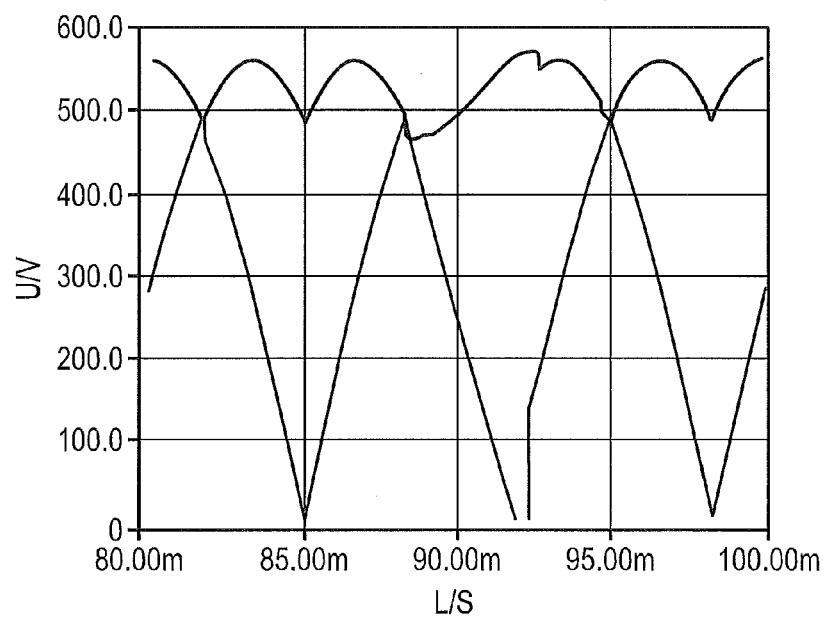
FIG. 10 shows the voltages in the resistive circuit during the charging of the intermediate circuit.

FIG. 10 shows the voltage waveforms across the resistors during the charging of the intermediate voltage circuit. The voltage waveforms are distorted until the time instant, when the charging resistor is by-passed and the voltage of the intermediate circuit has reached its operational value (approximately at t=94 ms). After that time instant the voltages in the resistive circuits are as indicated in FIGS. 6 and 8.

The method of the disclosure thus requires that the voltage of the intermediate circuit is equal to or higher than the induced voltage or the voltage of the mains, since the freewheeling diodes need to be in the blocking state as mentioned above.

At the beginning of the method of the disclosure the state of the alternating voltage source is unknown. This means in case of mains side converter that the supply network or voltages of the mains is unknown. In a case where the method is used in connection with the inverter, the alternating voltage source refers to the voltage induced by the rotating electrical machine, whereby the inertia of the machine and load keeps the machine rotating and where the inverter is not controlling the rotation. Typically the electrical machine is a motor and therefore acts as a generator when the method of the disclosure is implemented.

As stated above, the method of the disclosure can be used in connection with both inverter and mains side converter and in the following the method is explained in detail in connection with an inverter. The operation can be similar in connection with mains side converter, and detailed explanation relating to the method in connection with the mains side converter is considered unnecessary.

In the method of the disclosure a voltage limit Vref is defined. This voltage limit is shown in FIG. 6. Further, the voltages $U_{R1}$, $U_{R2}$, $U_{R3}$ produced by the rotating electrical machine and seen in the resistive circuits are compared with the voltage limit. Resistive circuits comprise resistive voltage divider circuits, i.e. at least two series-connected resistors. The purpose of the resistive circuit in connection with the disclosure is to produce a voltage that is proportional to the voltage induced by the rotating electrical machine, and, furthermore, to lower the voltage level suitable for control electronics.

When the comparison between the voltages and the voltage limit has begun, a first time instant T1 is determined when the voltage of any of the resistive circuits crosses the voltage limit. The voltages $U_{R1}$, $U_{R2}$, $U_{R3}$ in all of the resistive circuits are compared with the voltage limit Vref and when one of the mentioned voltages crosses the limit the time instant of that crossing is determined.

Since the procedure begins in a state where the rotational properties of the alternating voltage source (produced by electrical machine or supply voltage) are unknown, also the phase the voltage of which crossed the limit is determined. Each phase has a separate resistive circuit and the determination of the phase is thus a simple task. Also in connection with the crossing the direction of the crossing is determined. That is to say, it is determined, if the voltage that crossed the voltage limit had a rising or falling slope.

In the method of the disclosure the voltages of the resistive circuits are continuously monitored against the voltage limit after the first time instant. The second time instant T2 when the voltage of any of the resistive circuits crosses the voltage limit is also determined. The phase that crossed the voltage limit is also determined together with the direction of the crossing, similarly as in case of the first time instant.

After these two time instants the phase sequence of the rotating machine can be determined. The phase sequence refers in a known manner to the direction of rotation. The phase sequence is determined based on the knowledge that all the three phases cross the voltage limit one after the other depending on the direction of the crossings, i.e. if the first phase that crosses the limit is U2 and the second phase is U1, then the next one will be U3. If, for example, this is the order of the first two crossings (U2, U1), then it can be determined that the next crossing will be from the voltage of phase U3. The compared voltages are the voltages from the resistive circuits, i.e. voltages $U_{R1}$, $U_{R2}$ and $U_{R3}$. These voltages are derived directly from the induced voltages (U1, U2 and U3) and therefore the order of the voltages in the resistive circuits gives the order of the phases.

Since the consecutive crossings have different directions, the direction of the third crossing is the same as that of the first one. The first and the third crossings having the same direction, the order of the phases is: the phase that crossed first, the phase that will cross third and the phase that crossed second. In the above example the phase sequence is thus U2, U3, U1.

According to the method of the disclosure, after the two time instants T1, T2 a peak time instant T12 is calculated. This peak time is a time instant in the middle of the first time instant T1 and second time instant T2. Due to the symmetry of the voltage curves, between every two consecutive crossings the third induced phase voltage has a peak value which is either negative or positive. Whether the peak is positive or negative can be determined from the direction of the first crossing that occurred at the first time instant. If the direction of the first crossing is such that the voltage goes below the voltage limit, then the peak voltage is positive. If, on the other hand, the direction of the first crossing is such that the voltage is rising, then the peak voltage is negative.

Figure 7:
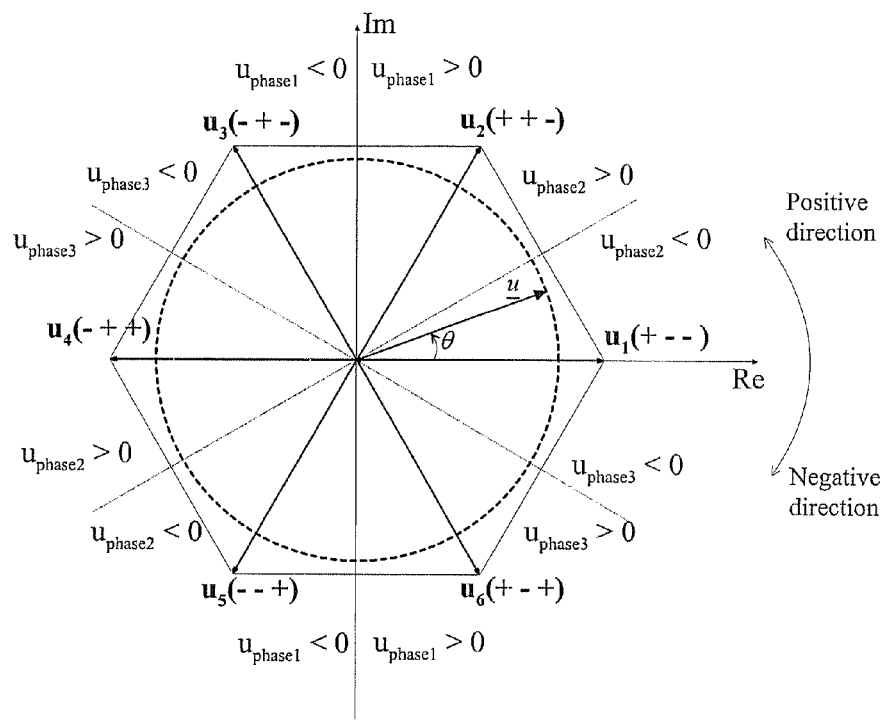
FIG. 7 shows a voltage space vector diagram.

FIG. 7 illustrates a voltage space vector $\bar{u}$, sometimes also denoted as space phasor. As known in the art, space vectors are rotating vectors in a complex plane that have a length and a direction. A space vector for a variable x of a three phase system having phases a, b and c is constructed using equation $$x = \frac{2}{3}(x_a + \underline{a}x_b + \underline{a}^2 x_c) = |x|e^{j\theta},$$

where $$\underline{a} = e^{j2\pi/3} = -\frac{1}{2} + j\frac{\sqrt{3}}{2}, \underline{a}^2 = e^{j4\pi/3} = -\frac{1}{2} - j\frac{\sqrt{3}}{2}$$

and |x| is the length of the space vector and θ is the angle between the vector and the positive real axis. The active voltage vectors of an inverter produce the vector diagram of FIG. 7.

FIG. 7 shows also the positive and negative phase sequences and the polarities of phase voltages. As known, the magnitudes of the phase voltages can be directly calculated from the rotating space vector.

Since at time instant T12 one of the phase voltages has a positive or negative peak value, the angle of the rotating space vector is also known at that instant. It can be seen from FIG. 7 that if, for example, phase U2 has a negative peak value at instant T12, then the angle of the voltage space vector is −60°.

According to the method of the disclosure third time instant T3 is determined similarly as the first two instants. As already mentioned, the first and third crossings have the same direction i.e. the voltage in the resistive circuit either rises or falls at both the first and third time instants. In an exemplary embodiment of the disclosure the frequency of the rotation of the rotating electrical machine is calculated from the first and third time instants. The time difference between the first and third time instants (T3-T1) is one third of the full rotation of induced stator voltage. The time period for the full rotation of the induced stator voltage is thus three times the said difference. Thus the electrical frequency f of the induced stator voltage can be calculated as $$f = \frac{1}{3 \times (T3 - T1)}.$$

The above embodiment determines the frequency quickly and is thus very usable when the inverter has to be synchronized with the rotating load quickly.

In another embodiment the frequency of the rotation is calculated by measuring further time instants where any of the voltages of the resistive circuits crosses the voltage limit as described above. Then every other crossing time instant is selected and fed to a phase-locked loop, which determines the frequency. Every other crossing means, in principle, that either rising or falling voltage slopes are taken into account. The phase-locked loop outputs the information on the frequency and can also output the information on how quickly the rotation is slowing down. The rate of slowing can be useful if the synchronization of the inverter to the load takes a relatively long time with respect to the frequency.

Now that the frequency, phase sequence and angle of the induced voltage at time instant T12 are known, the angle of the induced voltage, i.e. the angle of the space vector, can be calculated at a given time instant t with the following formula Angle(*t*)=Angle12+*k*(*t*−*T*12)×2π*f*, where Angle12 is the angle of the space vector at the time instant T12 and k is a coefficient indicating the phase sequence, and its value is 1 when the phase sequence is positive and −1 when the phase sequence is negative.

With the above formula the angle of the rotating voltage can be calculated for example for synchronization purposes so that the inverter control can be started.

In an exemplary embodiment of the disclosure also the magnitude of the induced voltage is determined. In case the rotating electrical machine producing the alternating voltage source is a permanently magnetized machine, the amplitude of the induced voltage can be calculated using equation E=pΦω where p is a constant depending on the structure of the machine, Φ is flux linkage of the machine and w is the angular frequency of the rotor of the electrical machine.

If the alternating voltage source is the mains supply, the voltage can be measured from the DC-link voltage.

According to another embodiment each of the voltages in the resistive circuits are A/D converted. In the conversion the analogue signals are digitized and the maximum value of the conversion is then considered as the amplitude of the induced line-to-line voltage.

Figure 9:
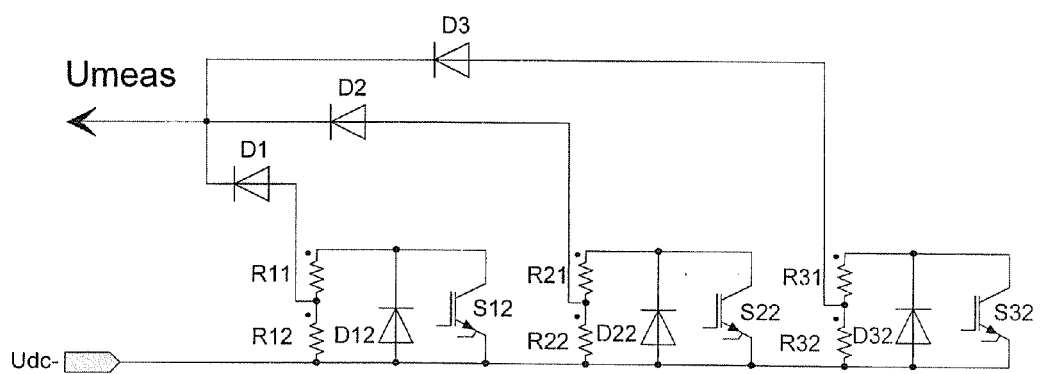
FIG. 9 shows an example of a circuit for determination of the alternating voltage magnitude.

FIG. 9 shows a dedicated measurement arrangement, in which the voltages of the resistive circuits are fed according to one exemplary embodiment of the disclosure. In this embodiment the voltages from the resistive circuits are fed to a common point through diodes D1, D2, D3. The basic rectifying function of the diodes D1, D2, D3 can be replaced with alternative circuit arrangements (e.g. operational amplifiers) that perform the same function. The voltage at the common point forms the voltage Umeas and it is basically the envelope of voltages in the resistive circuits $U_{R1}$, $U_{R2}$, $U_{R3}$. By measuring the envelope voltage the amplitude of the induced voltage can be determined at a first possible instant using only one measurement. Fast voltage measurement is needed if the information of the amplitude is used for synchronization purposes and when the synchronization with the inverter is done after the third time instant.

The measurement of the peak voltage gives the maximum line-to-line motor voltage from which the phase-to-neutral voltage can be obtained by dividing it by √3.

The method of the disclosure is at its best when the induced voltage is high. This is an exemplary behavior, because the larger the induced voltage is, the larger currents the incorrect inverter voltages causes.

The voltage limit Vref can be adjustable. The adjustability of the voltage limit allows the method to be implemented in different situations. If it is foreseen that the induced voltage is high in amplitude, a higher voltage limit is also chosen, and, on the other hand, if the induced voltage amplitude is lower, a lower voltage limit should be chosen.

In the following, a simple sequence according to the disclosure is described with reference to FIG. 6. First, the procedure is initialized for example in response to a request made to a frequency converter to start the control of an initially rotating motor. First crossing of the limit voltage is noticed at time instant T1 where voltage $U_{R3}$ drops below the limit voltage. A timer is started and T1 is set to zero.

Second limit voltage crossing is noticed at time instant T2, where voltage $U_{R2}$ rises above the limit voltage. From the two crossings the phase sequence is known to be U1, U2, U3, phase U1 having a positive maximum between these two crossings. Since the positive maximum of phase U1 is referred to as zero angle for voltage space vector, the angle between the crossings is Angle12=0°. Timer is read and the value of T2 is determined. Now the time for the phase U1 positive maximum and for angle12 is calculated as T12=(T2−T1)/2=T2/2.

The third reference crossing is noticed at time instant T3, where phase U1 goes below the voltage limit. The timer is read and the value is stored in T3. Output frequency is calculated as f=1/(3×(T3−T1))=1/(3×T3). The voltage angle (in radians) at time instant T3 is also calculated as Angle3=Angle12+*k**(*T*3−*T*12)*2*π**f*.

In this example the phase sequence is positive and thus k is 1.

Now the rotation direction, frequency and absolute angle of the voltage vector are known. The inverter can now start modulation and synchronize itself with the rotating motor using this information. If it is required that the synchronization is carried out in a most accurate way, also the magnitude of the induced voltage should be determined according to the exemplary embodiments of the disclosure.

Another exemplary embodiment of the disclosure is described with reference to FIG. 8, which shows similar voltage waveforms as FIG. 6. In this embodiment one of the voltages in the resistive circuits is selected to be the reference voltage to which other two voltages of the resistive circuits are compared. In this embodiment the first time instant and the second time instant are determined similarly as in the previously described embodiment. The difference is that the reference is not substantially constant, but is one of the voltages in the resistive circuits. In the example of FIG. 8 the reference voltage is selected to be the voltage in the resistive circuit $U_{R1}$ that is derived from the induced phase voltage U1.

According to this embodiment, when a crossing takes place (time instants T1' and T2'), i.e. a voltage drops below or rises above the reference, it is known that at that moment the third phase has either a positive or a negative peak value. By a third phase it is referred to that phase that is not the reference and not the voltage that crosses the reference. These phases are referred to as $U_{not\_crossT2}$ and $U_{not\_crossT1}$ at time instants T2' and T1', respectively.

It is thus already known that at time instant T1' one of the phases $U_{not\_crossT1}$ has a peak value. Also the phase in question is known. The direction (positive or negative) of the peak can also be directly determined. If the voltage in the resistive circuit of the phase that did not cross the reference voltage is higher than the reference voltage, then the peak is positive. And if the voltage in the resistive circuit of the phase that did not cross the reference voltage is lower than the reference voltage, the peak is negative. The information of the voltage of the third phase $U_{not\_crossT1}$ can be determined for example from the output of the comparator used in comparing the voltages. Thus already at the time instant T1' of the first crossing the angle of the voltage space vector is known.

At the time instant of the second reference crossing, similar conclusions are made as at the first time instant. Thus the angle of the induced stator voltage space vector is known at the second time instant T2'.

Now two consecutive peaks are determined and thus the phase sequence can be determined. If the reference crossings have the same directions, i.e. the compared voltages rose above the reference at both time instants T1', T2' or the compared voltages dropped below the reference at both time instants T1', T2', then the frequency of the induced stator voltage can be calculated as $$f=1/(6*(T2'-T1')).$$

If, on the other hand, the directions of the two crossings are different (either up, down or down, up), then the frequency is calculated as $$f=1/(3*(T2'-T1')).$$

Now the frequency, position and phase sequence are known and the angle of the space vector at any given time t can be calculated as $$\text{Angle}(t)=\text{Angle1}+k*(t-T1')*2*pi*f,$$

where k is either −1 or 1 depending on the direction of rotation and Angle1 is the angle of the space vector at the first time instant T1'.

Now referring more specifically to FIG. 8, the following situation is considered. $U_{R1}$ is selected to be the reference voltage and it is thus derived directly from induced phase voltage U1. After the beginning of the method the first reference crossing takes place at time instant T1'. The phase that crosses the limit is phase $U_{R2}$. Thus the third phase $U_{not\_crossT1}$ has a peak value at time instant T1'. Since voltage $U_{R2}$ relating to phase U crosses the reference ($U_R$), the phase U3 has the peak value. At that moment $U_{R3}$ is lower than the reference and thus the peak is negative. As shown in FIG. 7, the angle of the voltage space vector u at time instant T1' is 60°.

Next, the following reference crossing takes place at time instant T2', where $U_{R3}$ becomes higher than the reference. The third phase $U_{not\_crossT2}$ is thus U2 and the voltage in the resistive circuit $U_{R2}$ is higher than the reference and therefore phase U2 has a positive peak value at time instant T2'. The angle of the voltage space vector u is now 120°. The vector has thus rotated in the positive direction.

The consecutive crossings have same directions i.e. from below the reference to above it, and the frequency of the induced voltage can be calculated as $f=1/(6*(T2'-T1'))$. Also the angle of the vector can be calculated as Angle(t)=60°+(t−T1')*2*pi*f.

The above embodiment is favourable since the reference is scaled automatically to the rotation speed of the electrical machine and only two comparators are required for the method.

It will be obvious to a person skilled in the art that, as the technology advances, the inventive concept can be implemented in various ways. The inventive idea can be applied to other types of mains side converters, e.g. to so called Vienna rectifier. As mentioned above, the detailed description refers to induced voltage of a motor as an alternating voltage source. It should, however, be clear that the alternating voltage source is the mains voltage when the synchronizing converter is a mains side converter. The above-explained and claimed method applies as such also to converter. The invention and its embodiments are not limited to the examples described above but may vary within the scope of the claims.

What is claimed is:

1. A method of synchronizing an inverter to a three-phase motor after a supply network failure, comprising:
   determining a voltage induced on an intermediate circuit by the motor, wherein the intermediate circuit is connected to the inverter and includes upper and lower controllable switches for each phase of the motor, the upper and lower controllable switches are connected in series between upper and lower potentials of the intermediate voltage circuit, a free-wheeling diode is connected in parallel with each upper and lower controllable switch, and a resistive circuit is connected in parallel with each of the lower controllable switches;
   measuring voltages induced on each resistive circuit in the lower controllable switches of the intermediate circuit;
   selecting the voltage induced on a first resistive circuit corresponding to a first phase of the motor as a reference voltage, wherein the voltage induced on a second resistive circuit corresponding to a second phase of the motor and the voltage induced on a third resistive circuit corresponding to a third phase of the motor are at first voltage levels, respectively;
   establishing a first time instant when the induced voltage associated with one of the second or third phases of the motor changes to a second level, wherein a value of the phase associated with the induced voltage that does not change at the first time instant is a first peak value;
   establishing a second time instant when the induced voltage associated with the first peak value changes to a second level, wherein a value of the phase associated with the induced voltage that does not change at the second time instant is a second peak value;
   determining a polarity of the phases associated with the first and second peak values by comparing the associated induced voltages with the reference voltage; and
   determining an angle and direction of rotation of the motor at each time instant based on the polarities of the first and second peak values.

2. The method of claim 1, wherein the first voltage level of the voltage induced on the second resistor circuit is greater than the reference voltage and the first voltage level of the voltage induced on the third resistor circuit is less than the reference voltage.

3. The method of claim 2, wherein at the first time instant, the induced voltage associated with the second phase changes to a second level that is less than the reference voltage, and the third phase has a negative polarity because the voltage induced on the third resistive circuit less than the reference voltage.

4. The method of claim 3, wherein at the second time instant, the induced voltage associated with the third phase changes to a second level that is above the reference voltage, and the second phase has a positive polarity because the voltage induced on the second resistive circuit is greater than the reference voltage.

5. The method of claim 4, wherein the frequency of the alternating voltage source is calculated as $f=1/(3*(T2-T1))$ where T1 is the first time instant and T2 is the second time instant.

6. The method of claim 5, wherein the angle of rotation is calculated as $\text{Angle}(t)=\text{Angle1}+k\cdot(t-T1')*2\cdot\pi\cdot f,$ where Angle1 is an angle of a space vector at the first time instant T1', k=−1 or 1 depending on a direction of rotation, and t is a given time.

7. The method of claim 1, wherein the first voltage level of the voltage induced on the second resistor circuit is greater than the reference voltage and the first voltage level of the voltage induced on the third resistor circuit is greater than the reference voltage.

8. The method of claim 7, wherein at the first time instant, the induced voltage associated with the second phase changes to a second level that is less than the reference voltage, and the third phase has a positive polarity because the voltage induced on the third resistive circuit greater than the reference voltage.

9. The method of claim 8, wherein at the second time instant, the induced voltage associated with the third phase changes to a second level that is less than the reference voltage, and the second phase has a negative polarity because the voltage induced on the second resistive circuit is less than the reference voltage.

10. The method of claim 9, wherein the frequency of the alternating voltage source is calculated as $f=1/(6*(T2-T1))$ where T1 is the first time instant and T2 is the second time instant.

11. The method according to claim 1, wherein the voltage angle is calculated at a given time instant from a frequency, peak time instant, and the phase sequence.

12. The method of claim 11, wherein the reference voltage is adjustable.

13. A method of synchronizing a converter to a three-phase alternating mains supply after a network failure, comprising:
   determining a voltage induced on an intermediate circuit by the mains supply, wherein the intermediate circuit is connected to the converter and includes upper and lower controllable switches for each phase of the mains supply, the upper and lower controllable switches are connected in series between upper and lower potentials of the intermediate voltage circuit, a free-wheeling diode is connected in parallel with each upper and lower controllable switch, and a resistive circuit is connected in parallel with each of the lower controllable switches;
   measuring voltages induced on each resistive circuit in the lower controllable switches of the intermediate circuit;
   selecting the voltage induced on a first resistive circuit corresponding to a phase of the mains supply as a reference voltage, wherein the voltage induced on a second resistive circuit corresponding to a second phase of the mains supply and the voltage induced on a third resistive circuit corresponding to a third phase of the mains supply are at first voltage levels, respectively;
   establishing a first time instant when the induced voltage associated with one of the second or third phases of the mains supply changes to a second level, wherein a value of the phase associated with the induced voltage that does not change at the first time instant is a first peak value;
   establishing a second time instant when the induced voltage associated with the first peak value changes to a second level, wherein a value of the phase associated with the induced voltage that does not change at the second time instant is a second peak value;
   determining a polarity of the phases associated with the first and second peak values by comparing the associated induced voltages with the reference voltage; and
   determining an angle and direction of rotation of the mains supply at each time instant based on the polarities of the first and second peak values.

14. The method of claim 13, wherein the first voltage level of the voltage induced on the second resistor circuit is greater than the reference voltage and the first voltage level of the voltage induced on the third resistor circuit is less than the reference voltage.

15. The method of claim 14, wherein at the first time instant, the induced voltage associated with the second phase changes to a second level that is less than the reference voltage, and the third phase has a negative polarity because the voltage induced on the third resistive circuit less than the reference voltage.

16. The method of claim 15, wherein at the second time instant, the induced voltage associated with the third phase changes to a second level that is above the reference voltage, and the second phase has a positive polarity because the voltage induced on the second resistive circuit is greater than the reference voltage.

17. The method of claim 16, wherein the frequency of the alternating voltage source is calculated as $f=1/(3*(T2-T1))$ where T1 is the first time instant and T2 is the second time instant.

18. The method of claim 17, wherein the angle of rotation is calculated as $\text{Angle}(t)=\text{Angle1}+k\cdot(t-T1')*2\cdot\pi\cdot f,$ where Angle1 is an angle of a space vector at the first time instant T1', k=−1 or 1 depending on a direction of rotation, and t is a given time.

19. The method of claim 13, wherein the first voltage level of the voltage induced on the second resistor circuit is greater than the reference voltage and the first voltage level of the voltage induced on the third resistor circuit is greater than the reference voltage.

20. The method of claim 19, wherein at the first time instant, the induced voltage associated with the second phase changes to a second level that is less than the reference voltage, and the third phase has a positive polarity because the voltage induced on the third resistive circuit greater than the reference voltage.

21. The method of claim 20, wherein at the second time instant, the induced voltage associated with the third phase changes to a second level that is less than the reference voltage, and the second phase has a negative polarity because the voltage induced on the second resistive circuit is less than the reference voltage.

22. The method of claim 21, wherein the frequency of the mains supply is calculated as $f=1/(6*(T2-T1))$ where T1 is the first time instant and T2 is the second time instant.

* * * * *